(12) United States Patent
Taylor

(10) Patent No.: US 7,578,486 B1
(45) Date of Patent: Aug. 25, 2009

(54) DRIP HOSE HANGER

(76) Inventor: Jim Taylor, 14311 Newport Ave., #G533, Tustin, CA (US) 92780

( * ) Notice: Subject to any disclaimer, the term of this patent is extended or adjusted under 35 U.S.C. 154(b) by 1084 days.

(21) Appl. No.: 10/388,219

(22) Filed: Mar. 14, 2003

Related U.S. Application Data

(63) Continuation-in-part of application No. 09/799,349, filed on Mar. 6, 2001, now abandoned, which is a continuation-in-part of application No. 09/576,127, filed on May 22, 2000, now abandoned.

(51) Int. Cl.
*A62C 13/76* (2006.01)
(52) U.S. Cl. ...................... 248/75; 248/316.7
(58) Field of Classification Search .............. 248/61, 248/62, 74.1, 74.2, 75, 214, 215, 301, 303, 248/316.7; 24/336
See application file for complete search history.

(56) References Cited

U.S. PATENT DOCUMENTS

| | | | |
|---|---|---|---|
| 355,491 A | 1/1887 | Wiley | |
| 553,194 A | 1/1896 | Lewis | |
| D34,263 S | 3/1901 | Bailey | |
| 809,993 A | 1/1906 | Sorg | |
| 810,004 A * | 1/1906 | Tabler | 248/61 |
| 886,241 A * | 4/1908 | Norton | 24/130 |
| 1,146,981 A | 7/1915 | Weinberg | |
| 1,730,959 A | 10/1929 | Warfield, Jr. | |
| 2,210,722 A | 8/1940 | Klein | |
| 2,417,244 A | 3/1947 | Eggert et al. | |
| 2,835,464 A | 5/1958 | Kolodin | |
| 3,630,448 A | 12/1971 | Chapin | |
| 3,802,655 A | 4/1974 | Schuplin | |
| 3,834,674 A | 9/1974 | Jackson | |
| 4,047,683 A | 9/1977 | Takeuchi | |
| 4,050,187 A | 9/1977 | Geiger et al. | |
| 4,260,123 A | 4/1981 | Ismert | |
| 4,407,478 A | 10/1983 | Hodges | |
| D272,887 S | 3/1984 | Parton | |
| 4,744,535 A | 5/1988 | Patenaude | |
| 4,753,196 A | 6/1988 | Lack et al. | |
| D308,015 S * | 5/1990 | Volpe et al. | D8/367 |
| 5,018,260 A | 5/1991 | Ziu | |
| 5,141,192 A * | 8/1992 | Adams | 248/231.81 |
| 5,423,501 A | 6/1995 | Yu | |
| 5,474,268 A | 12/1995 | Yu | |
| 5,613,656 A | 3/1997 | Protz, Jr. | |
| 5,678,609 A | 10/1997 | Washburn | |
| 5,878,963 A | 3/1999 | Bates | |
| 5,957,416 A * | 9/1999 | Sellati | 248/61 |
| D438,449 S | 3/2001 | Taylor | |
| 6,378,175 B1 * | 4/2002 | Vanderpan | 24/336 |
| 6,390,421 B1 | 5/2002 | Rudd | |
| 6,408,492 B1 | 6/2002 | Sparks et al. | |
| 6,443,401 B1 | 9/2002 | Vanderpan | |
| 2004/0262462 A1 * | 12/2004 | Polak et al. | 248/74.1 |

OTHER PUBLICATIONS

Merriam-Webster's Collegiate Dictionary, Tenth Edition, "groove", p. 514.*

* cited by examiner

*Primary Examiner*—Korie H. Chan
(74) *Attorney, Agent, or Firm*—Shlesinger, Arkwright & Garvey LLP

(57) ABSTRACT

A drip hose hanger comprises a body including a saddle portion and structure for securing the body to a support. The saddle portion includes an inside surface to support a portion of the hose and is provided with axial grooves to minimize twisting of the hose within the saddle.

16 Claims, 4 Drawing Sheets

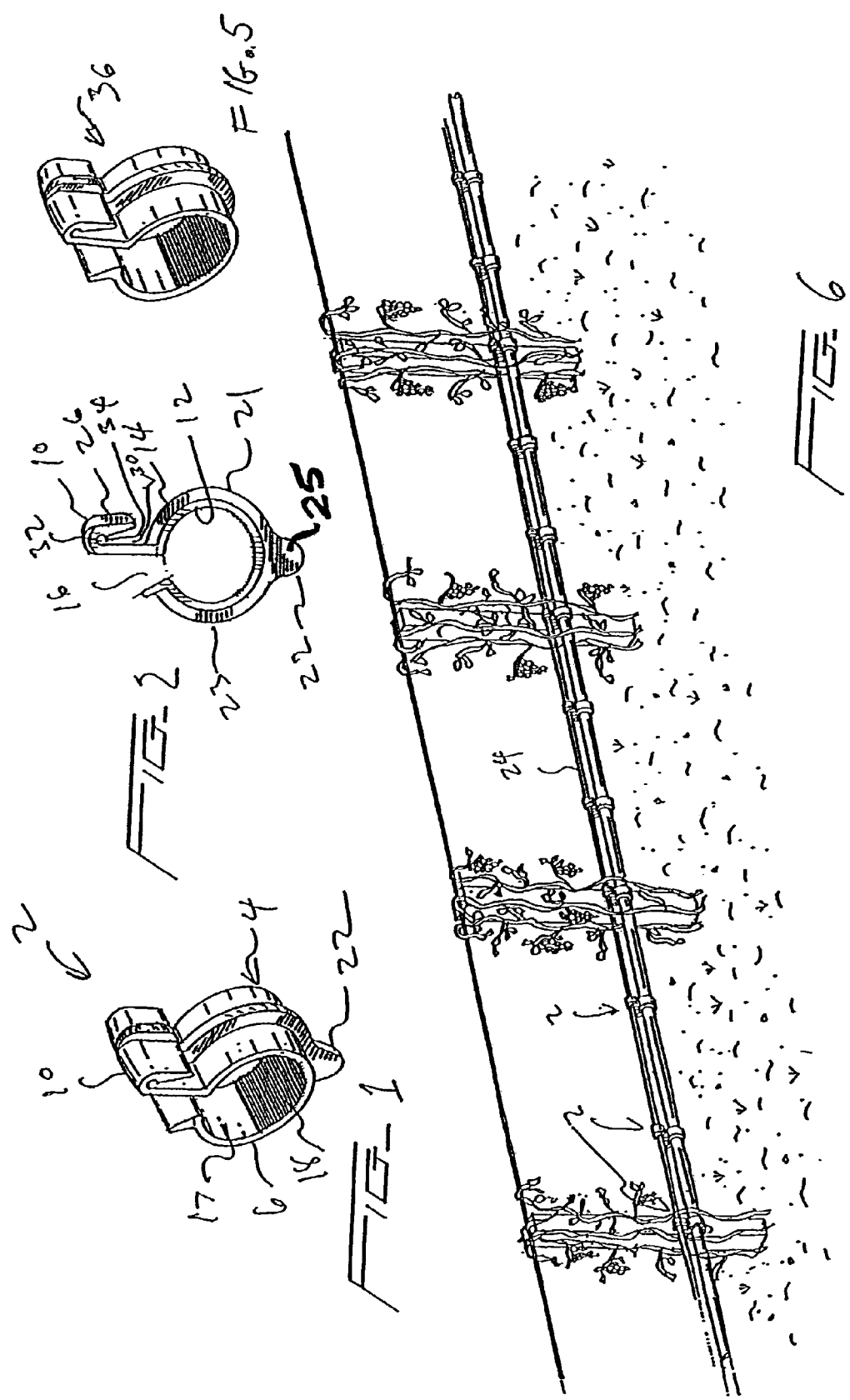

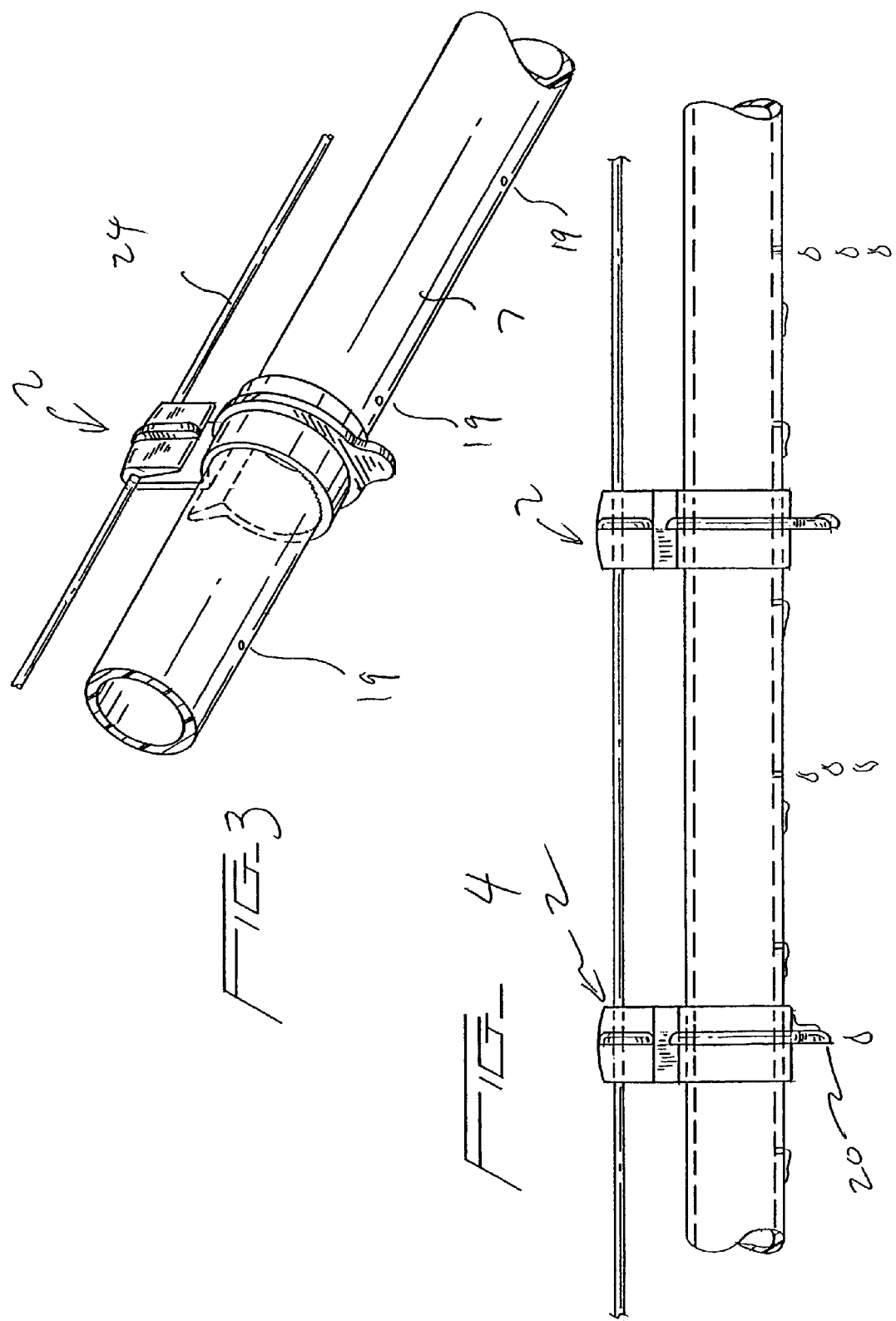

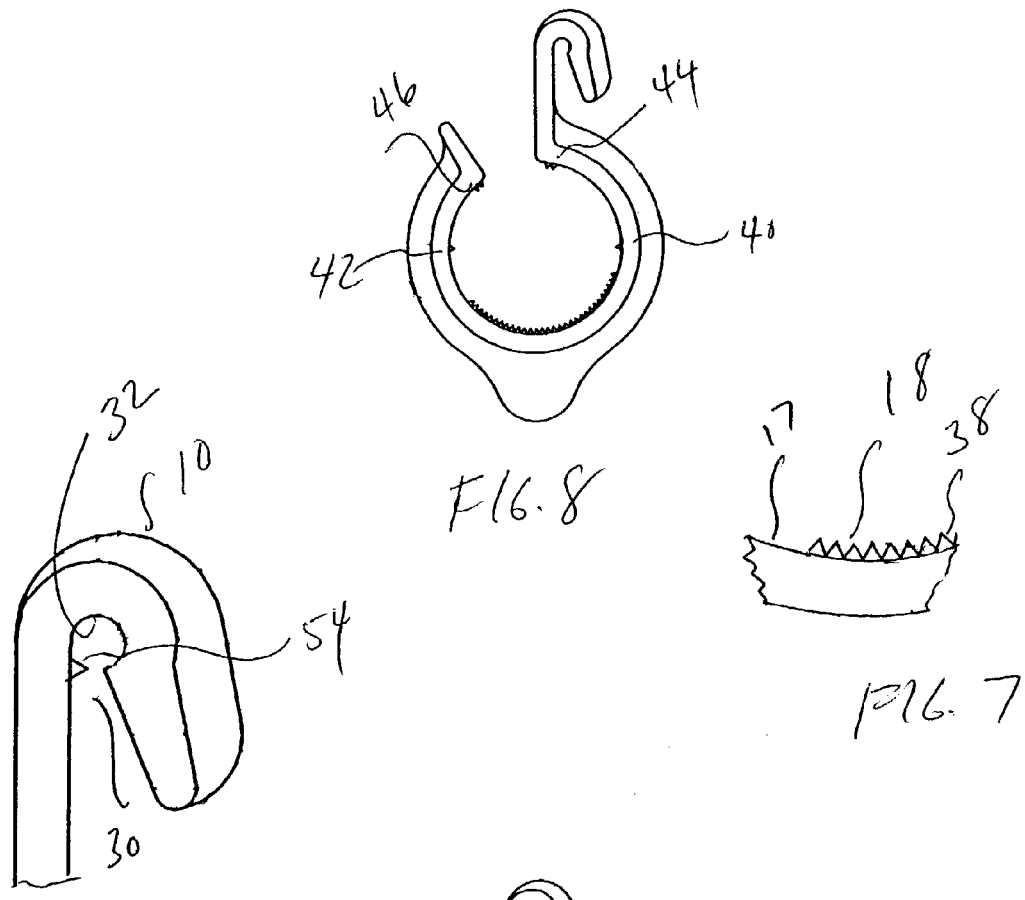
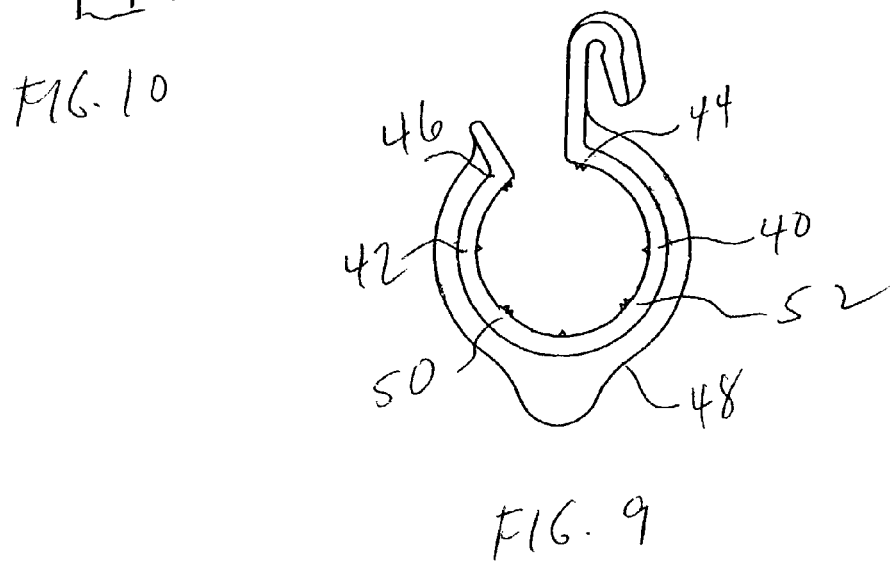
FIG. 8
FIG. 7
FIG. 10
FIG. 9

DRIP HOSE HANGER

RELATED APPLICATIONS

This application is a continuation-in-part of application Ser. No. 09/799,349 filed Mar. 6, 2001 now abandoned, which is a continuation-in-part of application Ser. No. 09/576,127 filed May 22, 2000 now abandoned.

FIELD OF THE INVENTION

The present invention is generally directed to a hanger and particularly to a hanger for supporting a drip hose along a row of plantings.

BACKGROUND OF THE INVENTION

Hangers are used to secure a drip hose, also called an irrigation dripline, along a row of plantings found in a vineyard or orchards. Prior art hangers are deficient in that they allow the drip hose to twist after it has been hanged, thereby causing the emitters or holes to be displaced from their intended orientation to effectively water the plantings. Consequently, valuable water is wasted.

Prior art hangers also do not have means for directing water flowing by surface tension along the underside of the hose. This water flow eventually drips down randomly to the ground where it may not be needed. Valuable water is again wasted.

Some prior art hangers also require relatively more time to install than others. For example, to use a conventional agricultural tie involves looping it around the hose and the support wire, threading the free end into the locking end, and pulling the loop tight. The time it takes to hang a drip hose can be reduced by using a more easily installable hanger.

There is, therefore, a need for a drip hose hanger that will obviate the shortcomings of prior art hangers.

OBJECTS AND SUMMARY OF THE INVENTION

It is an object of the present invention to provide a drip hose hanger that minimizes twisting of the drip hose after hanging, thereby avoiding misdirecting the water flow away from the plantings.

It is another object of the present invention to provide a drip hose hanger that controls the migration of water flowing along the underside of the hose, thereby directing the water where it is needed.

It is yet another object of the present invention to provide a drip hose hanger that can be hanged from a support wire of various gauges.

It is another object of the present invention to provide a drip hose hanger that is relatively easy to install.

It is still another object of the present invention to provide a hose hanger with a compact, substantially sleeve-like shaped body so that its combination with a drip hose, when secured to the hose by the hose manufacturer, provides a compact package for handling.

In summary, the present invention provides a drip hose hanger, comprising a body including a saddle portion and structure for securing the body to a support wire. The saddle portion includes an inside surface to support a portion of the hose and is provided with axial grooves to minimize twisting of the hose within the saddle portion when hung from the support wire. The saddle portion also includes a rib that aids in diverting water flowing along the underside of the hose to the ground. The structure for securing the body to the support wire may be a hook portion integrated with the saddle portion, or a recess within the inside surface of the saddle portion and is adapted to receive a portion of the support wire from which it is supported during use. The hook portion may also include an opening that snaps around the support wire of various sizes.

These and other objects of the present invention will become apparent from the following detailed description.

BRIEF DESCRIPTIONS OF THE DRAWINGS

FIG. 1 is a perspective view of a drip hose hanger made in accordance with the present invention.

FIG. 2 is a side elevation view of FIG. 1.

FIG. 3 is a perspective view of the hanger of FIG. 1 shown secured to a support wire and a drip hose.

FIG. 4 is a side view of FIG. 3, showing water droplets moving along the bottom surface of the hose and dripping downwardly where it meets the hanger.

FIG. 5 is a perspective view of another embodiment of a drip hose hanger made in accordance with the present invention.

FIG. 6 is a perspective view of a row of plantings using a drip hose supported by a number of hangers made in accordance with the present invention.

FIG. 7 is an enlarged fragmentary view of the grooves used to provide the means for minimizing twisting of the drip hose supported by the hanger of the present invention.

FIG. 8 is a side elevational view showing another embodiment of the configuration of the grooves used to minimize twisting of the drip hose when supported by the hanger of the present invention.

FIG. 9 is a side elevational view showing yet another embodiment of the configuration of the grooves in the saddle portion of the hanger.

FIG. 10 is an enlarged fragmentary side elevational view of the hook portion of the hanger of the present invention, showing a projection disposed in the opening that receives the support wire.

DETAILED DESCRIPTION OF THE INVENTION

Figure 11:
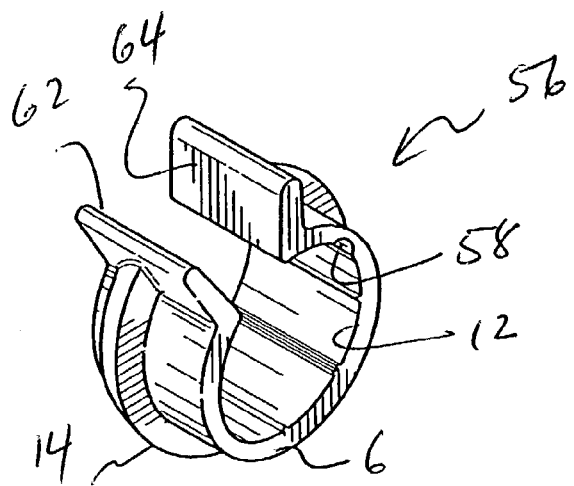
FIG. 11 is a perspective view of another embodiment of a a drip hose hanger made in accordance with the present invention.

A drip hose hanger 2 made in accordance with the present invention is disclosed in FIGS. 1 and 2. The hanger 2 has a unitized flexible body 4 having a saddle portion 6 and a hook portion 10. The saddle portion 6 includes a circular opening 12 configured to receive thereto a drip hose 7, as best shown in FIG. 3. The saddle portion 6 is configured to grip the hose to keep it from moving in either the lateral or twisting direction. A rib 14 adds strength to the opening 12 and directs water flowing along the underside of the hose to the ground. The rib 14 extends around the exterior surface of the saddle portion, as best shown in FIG. 2. A gap 16 provides means for slipping the drip hose into the circular opening 12. The gap 16 is wedge-shaped to facilitate the insertion of the hose into the opening 12.

A plurality of grooves 18 are disposed on an inside surface 17 of the saddle portion 6 and are oriented in the same direction as the drip hose to advantageously minimize twisting of the drip hose so that the emitters or holes 19 in the drip hose do not become mis-oriented. The emitters are generally disposed so that water from the hose is directed towards the ground in the area of the plant roots. The grooves 18 are disposed in a part of the opening 12 defined by an arc from 0° to −180°, as viewed in FIG. 2 with the origin of the arc in the center of the opening 12. Preferably, there are more grooves on the front side 21 of the of saddle portion than on the back side 23 to advantageously provide more gripping force to counteract a twisting force from the hose. For example, the grooves may be disposed between about −180 and −142°.

The rib 14 has a sharp edge 20 that advantageously breaks up the water tension of water dripping along the underside of the saddle portion 6, thereby causing the water to drip down to ground below the hanger where intended by the user, as best shown in FIG. 4. The rib 14 also includes a downwardly directed projection 22 that further promotes the dripping of the water to the ground. The projection 22 has a surface 25 disposed substantially transverse to the length of the hose 7 and is tapered from wide to narrow toward the ground.

The hook portion 10 is adapted to clip to a support wire 24 or other standard support, as best shown in FIG. 3. The fit is snap tight to minimize movement on the support. The hook portion also includes a rib 26 that provides strength and stiffness. The hook portion 10 has a wedge-shaped slot 30 that communicates with opening 32 to advantageously facilitate the snapping of the hanger onto the support wire 24. The slot 30 is reduced to a narrow opening 34, which is smaller than the diameter of the opening 32 so that once the hanger is snapped onto the support 24, the hanger will not get accidentally separated from it.

Another embodiment of a drip hose hanger 36 is disclosed in FIG. 5. The hanger 36 is similar to the hanger 2, except that it does not have the projection 22.

In use, a plurality of drip hose hangers 2 are secured onto the support wire 24, which is typically strung between posts along a planting row. The drip hose is then supported by the saddle portion 6 and is generally oriented so that the emitters 19 are directed towards the ground in the area of the plant roots. Water that clings and runs along the underside of the hose is intercepted and broken up by the sharp edge 20 of the rib 14. Accordingly, the hangers 2 may be positioned above the ground where the dripping water is desired fall. The projection 22 of the rib 14 further enhances the dripping feature of the hanger.

To install a hanger, the hook portion is snapped onto the support wire by guiding the wire into the wedge-shaped slot 30 and pulling on the hanger until it snaps in place. The drip hose 7 is then slipped into the wedge-shaped slot 16 so as to occupy the opening 12. The hose is turned within the saddle portion 6 so that the emitters 19 are oriented in the right direction. Alternatively, the hanger may be secured to the hose first before the hanger is snapped onto the support wire.

The drip hose hanger 2 has a uniform and relatively wide width, as best shown in FIG. 4, to prevent denting of the hose by the saddle portion 6, which could develop into a constriction in the hose and to provide the hook portion a large area with which to grip the support wire 24.

The hanger 2 may be made from plastic material or other suitable materials and may be cast in one unitized piece. The material used must have some flexibility to permit the slots 16 and 30 to widen to accept the hose and the support wire, respectively, during installation.

Referring to FIG. 7, the grooves 18 are formed from a plurality of projections 38 which are triangular in cross-section with the apex of each triangle being directed toward the center of the opening 12. The projections 38 extend above the inside surface 17. Other cross-sectional shapes for the projections may be used.

The grooves 18 may be disposed in a different configuration within the opening 12. For example, in another embodiment disclosed in FIG. 8, projections 38 are disposed at positions 40, 42, 44 and 46, in addition to the grooves shown in FIG. 1. The additional projections further help to minimize the twisting of the drip hose within the opening 12. In another embodiment, the grooves disposed at the bottom portion of the opening 12 shown in FIG. 8 are replaced with projections 38 at positions 48, 50 and 52. The locations and numbers of the grooves and projections 38 within the opening 12 provide the means for minimizing the twisting of the drip hose when supported by the hanger.

Referring to FIG. 10, a projection 54, similar to the projection 38, is provided within the opening 32 to make the entrance to the opening 32 slightly smaller and allow the use of the hanger with a smaller gauge support wire, while still permitting use with a larger gauge wire. For example, the projection 54 may be sized and positioned so that the hanger may be used with 12, 13 or 14 gauge wires. The projection 54 is preferably disposed at the entrance to the opening 32 adjacent the wedge-shaped slot 30. A triangular cross-section for the projection 54 is disclosed, but other cross-sectional shapes may be used. After the smaller wire is pushed beyond the smaller entrance opening, the wire would stay within the opening 32 and the projection 54 would prevent it from slipping back through the narrowed entrance opening.

Figure 12:
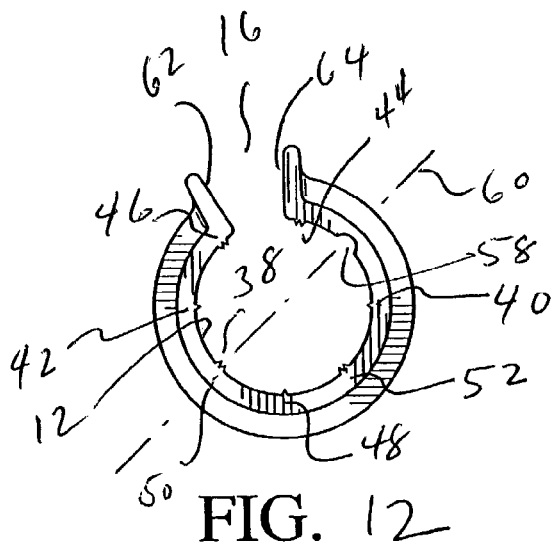
FIG. 12 is right side view of FIG. 11.
Figure 13:
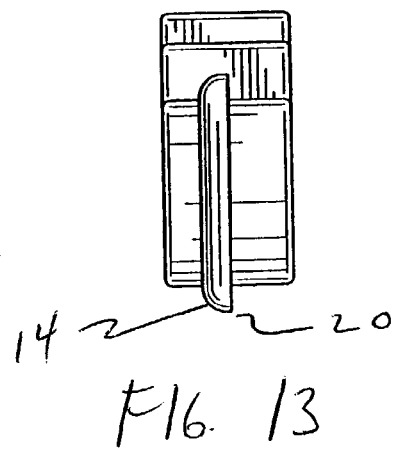
FIG. 13 is a left side view of FIG. 12.

Referring to FIGS. 11, 12 and 13, another embodiment of a drip hose hanger 56 is disclosed. The hose hanger 56 is similar to the other embodiments, except that the hook portion 10, shown for example, in FIG. 2, and its function has been replaced by an axial recess 58 within the circular opening 12. The recess 58 is adapted to receive the support wire 24. While the recess 58 is shown as partly circular in cross-section, other shapes, such as triangular, will also work, since what is needed is for the support wire to be received in a recess. The recess 58 is preferably disposed diametrically opposite the projections 38 at position 50. This will make the projections at positions 48, 52 and 40 to be symmetrically disposed with respect to the projections at positions 42, 46 and 44 with respect to an imaginary line 60 joining the recess 58 and the projections at position 50, as best shown in FIG. 11. This will provide substantially uniform distribution of the projections 38 around the hose when hung by the recess 58. Note that the imaginary line 60 will attain a substantially vertical orientation when the hanger 56 is hung from the support wire 24 with the hose within the opening 12. The recess 58 is disposed along the direction of the length of the support wire 24 and along the same direction as the projections 38.

By removing the hook portion 10 and incorporating its function within the opening 12, the hose hanger 56 takes on a substantially sleeve-like configuration, as shown in FIG. 12, making the hose hanger 56 advantageously more compact, thereby allowing for installation of the support hanger 56 during the manufacture of the drip hose 7 without making the combination too bulky. The compact shape of the hose hanger 56 provides a compact combination package with the hose hanger, allowing the hose manufacturer to incorporate the hanger during manufacture of the hose. The recess 58 is advantageously disposed near the slot 16 to allow for convenience of hanging the hose hanger 56 to the support wire when the hanger 56 is secured to the drip hose prior to hanging onto the support wire.

The height of the rib 14 and the thickness of the saddle portion 6 provide an inverted staircase configuration to advantageously force any water dripping along the bottom surface of the hose through a torturous path to thereby break-up the water stream and allow the water to drip directly below the hose hanger. In addition, the sharp edge 20 of the rib 14 further contributes to the break-up of the water stream.

The slot 16 includes a pair of opposing ramp surfaces 62 and 64 adapted to force the hanger 56 around the hose diameter without injuring the hose in the process while the hose is flattened down.

Like the other embodiments, the hanger 56 is preferably molded in one piece from plastic.

While this invention has been described as having preferred design, it is understood that it is capable of further modification, uses and/or adaptations following in general the principle of the invention and including such departures from the present disclosure as come within known or customary practice in the art to which the invention pertains, and as may be applied to the essential features set forth, and fall within the scope of the invention or the limits of the appended claims.

I claim:

1. A drip hose hanger, comprising:
   a) a body including a saddle portion and means for securing said body to a support;
   b) said saddle portion including an inside surface to support a portion of the hose, said inside surface including lateral grooves to minimize twisting of the hose within said saddle portion during use;
   c) said saddle portion including an outside surface;
   d) a rib secured to said outside surface; and
   e) said rib including a projection extending downwardly to divert water to the ground.

2. A drip hose hanger as in claim 1, wherein said rib includes a sharp edge.

3. A drip hose hanger as in claim 1, wherein:
   a) said saddle portion includes an opening configured to accommodate the diameter of the hose; and
   b) said saddle portion includes a slot communicating with said opening.

4. A drip hose hanger as in claim 3, wherein said slot is wedge-shaped.

5. A drip hose hanger as in claim 1, wherein said rib extends around said saddle portion.

6. A drip hose hanger as in claim 5, wherein:
   a) said saddle portion includes a bottom portion with a thickness; and
   b) said rib forms a staircase with said bottom portion thickness to break up water flowing along an underside of the hose to the ground.

7. A drip hose hanger, comprising:
   a) a body including a saddle portion and means for securing said body to a support;
   b) said saddle portion including an inside surface to support a portion of the hose, said inside surface including lateral grooves to minimize twisting of the hose within said saddle portion during use;
   c) said saddle portion including an opening configured to accommodate the diameter of the hose;
   d) said saddle portion includes a slot communicating with said opening; and
   e) said opening is circular.

8. A drip hose hanger as in claim 7, wherein said grooves are formed by triangular projections in cross-section.

9. A drip hose hanger as in claim 7, wherein said slot includes a pair of opposing ramp surfaces adapted to force said body around the hose outside diameter.

10. A drip hose hanger as in claim 7, wherein:
    a) said body includes an outside surface;
    b) a rib secured to said outside surface; and
    c) said rib extends around said outside surface.

11. A drip hose hanger as in claim 10, wherein:
    a) said body includes a bottom portion with a thickness; and
    b) said rib forms a staircase with said bottom portion thickness to break up water flowing along an underside of the hose to the ground.

12. A drip hose hanger as in claim 11, wherein said rib includes a sharp edge.

13. A drip hose hanger as in claim 7, wherein said body is plastic.

14. A drip hose hanger as in claim 7, wherein said inside surface includes a recess disposed in the direction of the length of the support wire, said recess being adapted to receive the support wire.

15. A drip hose hanger as in claim 14, wherein:
    a) said recess is disposed near said slot; and
    b) said recess is partly circular in cross-section.

16. A drip hose hanger as in claim 14, wherein said grooves are disposed symmetrically about a diametrical line drawn across the opening of said body and through said recess.

* * * * *